(12) United States Patent
Dom et al.

(10) Patent No.: US 7,809,705 B2
(45) Date of Patent: Oct. 5, 2010

(54) SYSTEM AND METHOD FOR DETERMINING WEB PAGE QUALITY USING COLLECTIVE INFERENCE BASED ON LOCAL AND GLOBAL INFORMATION

(75) Inventors: Byron Edward Dom, Los Gatos, CA (US); Alexandrin Popescul, Mountain View, CA (US); Tong Zhang, Tuckahoe, NY (US)

(73) Assignee: Yahoo! Inc., San Jose, CA (US)

( * ) Notice: Subject to any disclaimer, the term of this patent is extended or adjusted under 35 U.S.C. 154(b) by 550 days.

(21) Appl. No.: 11/706,025

(22) Filed: Feb. 13, 2007

(65) Prior Publication Data

US 2008/0195631 A1    Aug. 14, 2008

(51) Int. Cl.
G06F 7/00 (2006.01)
G06F 17/30 (2006.01)

(52) U.S. Cl. ........................................ 707/706; 707/723

(58) Field of Classification Search .................... 707/10
See application file for complete search history.

(56) References Cited

U.S. PATENT DOCUMENTS

| | | | |
|---|---|---|---|
| 5,895,470 A | 4/1999 | Pirolli | |
| 6,112,202 A | 8/2000 | Kleinberg | |
| 6,285,999 B1 | 9/2001 | Page | |
| 6,349,296 B1 | 2/2002 | Broder | |
| 6,363,379 B1 | 3/2002 | Jacobsen | |
| 6,389,436 B1* | 5/2002 | Chakrabarti et al. | 715/229 |
| 6,654,743 B1 | 11/2003 | Hogg | |
| 6,847,992 B1 | 1/2005 | Haitsuka | |
| 6,901,398 B1* | 5/2005 | Horvitz et al. | 1/1 |
| 6,990,628 B1 | 1/2006 | Palmer | |
| 7,028,029 B2 | 4/2006 | Kamvar | |
| 7,117,202 B1* | 10/2006 | Willoughby | 707/3 |
| 7,308,643 B1 | 12/2007 | Zhu | |
| 7,533,124 B2* | 5/2009 | Hellman et al. | 707/103 R |
| 2002/0059219 A1 | 5/2002 | Neveitt | |
| 2003/0163597 A1* | 8/2003 | Hellman et al. | 709/316 |

(Continued)

OTHER PUBLICATIONS

Pavel Calado, "Link-based Similarity Measures for the Classification of Web Documents", Journal of the American Society for information Science and Technology, 2006, pp. 208-221.*

(Continued)

*Primary Examiner*—Kuen S Lu
*Assistant Examiner*—Tuan Pham
(74) *Attorney, Agent, or Firm*—Baker Botts L.L.P.

(57) ABSTRACT

An improved system and method is provided for determining web page quality using collective inference based on local and global web page information. A classification engine may be provided for classifying a web page using local features of a seed set of web pages and global web graph information about the seed set of web pages. A dual algorithm based on graph regularization formulated as a well-formed optimization solution may be used in an embodiment for applying collective inference for binary classification of the web page using the local web page information and global web graph information of a web page, the local web page information and global web graph information of an authoritative set of web pages, and the local web page information and global web graph information of a non-authoritative set of web pages.

24 Claims, 8 Drawing Sheets

U.S. PATENT DOCUMENTS

| | | |
|---|---|---|
| 2003/0177118 A1 | 9/2003 | Moon |
| 2003/0208482 A1 | 11/2003 | Kim |
| 2003/0221166 A1 | 11/2003 | Farahat |
| 2004/0054690 A1* | 3/2004 | Hillerbrand et al. ...... 707/104.1 |
| 2004/0143569 A1* | 7/2004 | Gross et al. .................... 707/3 |
| 2004/0193698 A1 | 9/2004 | Lakshminarayana |
| 2005/0086260 A1 | 4/2005 | Canright |
| 2005/0171946 A1 | 8/2005 | Maim |
| 2006/0095281 A1 | 5/2006 | Chickering |
| 2006/0195439 A1 | 8/2006 | Selberg |
| 2006/0282455 A1 | 12/2006 | Lee |
| 2007/0073579 A1 | 3/2007 | Immorlica |
| 2007/0143322 A1 | 6/2007 | Kothari |
| 2007/0185871 A1 | 8/2007 | Canright |
| 2007/0288437 A1* | 12/2007 | Xia .............................. 707/3 |
| 2008/0010281 A1 | 1/2008 | Berkhin |
| 2008/0010292 A1 | 1/2008 | Poola |
| 2008/0050712 A1* | 2/2008 | Madani et al. .............. 434/350 |
| 2008/0052263 A1 | 2/2008 | Andersen |
| 2008/0097988 A1* | 4/2008 | Broder et al. .................. 707/5 |
| 2008/0109389 A1* | 5/2008 | Polyak et al. ................. 706/12 |
| 2009/0240677 A1 | 9/2009 | Parekh |

OTHER PUBLICATIONS

Tong Zhang, "On the Dual Formulation of Regularized Linear System with Convex Risks", Kluver Academic Publisher, Netherlands, 2002.*

Haveliwala, T. H., "Topic-sensitive PageRank," May 2002, *In Proceedings of the Eleventh International World Wide Web Conference*, Honolulu, HI.

Kleinberg, J. M., "Authoritative Sources in a Hyperlinked Environment," *Journal of the ACM*, 46(5):604-632, 1999.

theGypsy, Yahoo follows up Personalized PageRank with HarmonyRank, " http://www.huomah.com/Search-Engines/Algorithm-MatterslYahoo-follows-up-Personalized-PageRank-with-HarmonyRank.html", Apr. 3, 2008.

Office Action for U.S. Appl. No. 11/542,079 dated May 17, 2010.
Office Action for U.S. Appl. No. 11/542,079 dated Dec. 23, 2009.
Office Action for U.S. Appl. No. 11/542,079 dated Jul. 8, 2009.
Office Action for U.S. Appl. No. 11/542,079 dated May 15, 2008.

* cited by examiner

US 7,809,705 B2

SYSTEM AND METHOD FOR DETERMINING WEB PAGE QUALITY USING COLLECTIVE INFERENCE BASED ON LOCAL AND GLOBAL INFORMATION

FIELD OF THE INVENTION

The invention relates generally to computer systems, and more particularly to an improved system and method for determining web page quality using collective inference based on local and global web page information.

BACKGROUND OF THE INVENTION

Existing relational learning techniques may be applied for text classification including documents such as web pages. Typically, relational learning techniques may start with a classification method, such as linear classification, and make improvements in the classification using the text information provided. In particular, hyperlinks among web documents may provide useful information for improving accuracy of document classification. For example, hyperlink information has been used to refine classes of graph neighbors seeded with a text only classifier by applying an EM-like technique to significantly improve Yahoo Directory classification accuracy. See S. Chakrabarti, B. Dom, and P. Indyk, *Enhanced Hypertext Categorization Using Hyperlinks*, In SIGMOD'98, 1998. Other techniques have been applied for aggregating neighborhood class assignments. See S. Macskassy and F. Provost, *Classification in Networked Data: A Toolkit and a Univariate Case Study*, Technical Report CeDER-04-08, Stern School of Business, New York University, 2004, which analyzes classification performance with various configurations of local classifiers, relational classifiers, and collective inference methods for propagating evidence through the graph. Also see D. Jensen, J. Neville, and B. Gallagher, *Why Collective Inference Improves Relational Classification*, in KDD'04, 2004, for a related study. Methods originating in inductive logic programming have also been applied to classification with hyperlinks. See M. Craven and S. Slattery, *Relational Learning with Statistical Predicate Invention: Better Models for Hypertext*, Machine Learning, 43:97-119, 2001, for the use of a combination of FOIL and Naive Bayes for classification in the WebKB data.

Many of these link-based relational learning models may either implement a procedure that does not solve an optimization problem and, consequently, such procedures do not necessarily converge, or may require approximate Bayesian inference due to the non-convexity of the underlying Bayesian formulation. A different approach is needed for combining link and text information that leads to a well-formed convex optimization solution that can be efficiently computed. Although some theoretical aspects of combining link and text information were discussed in recent work, the theoretical combinations discussed fail to lead to implementable algorithms suitable for large scale text classification problems. See for instance, A. Argyriou, M. Herbster, and M. Pontil, Combining Graph Laplacians for Semi-supervised Learning, In NIPS'05, 2006.

What is needed is a system and method for combining link and text information in an implementable solution suitable for large scale text classification problems. Such a system and method should be able to train a classifier for classifying very large numbers of documents such as web pages accessible through the World Wide Web for online applications.

SUMMARY OF THE INVENTION

Briefly, the present invention may provide a system and method for determining web page quality using collective inference based on local and global web page information. To do so, a classification engine may be provided for classifying a web page using local features of a seed set of web pages and global web graph information about the seed set of web pages. In an embodiment, a classification engine may include an operably coupled binary classifier for performing binary classification to provide a binary score for a web page, and a collective inference engine operably coupled to the binary classifier for performing collective inference using the local features of the seed set of web pages and the global web graph information about the seed set of web pages.

The present invention may determine the quality of a web page by receiving local web page information and web graph information of seed sets and applying collective inference using local web page information and global web graph information of the web page and using local web page information and global web graph information of the seed sets. In an embodiment, collective inference may be applied for binary classification of the web page using the local web page information of the web page and the global web graph information about the web page, local web page information of an authoritative set of web pages and global web graph information about the authoritative set of web pages, and the local web page information of a non-authoritative set of web pages and global web graph information about the non-authoritative set of web pages. A dual algorithm based on graph regularization formulated as a well-formed optimization solution may be used in an embodiment for implementing collective inference for binary classification of a web page using the local and global information of the web page and using the local and global information of the seed sets.

The present invention may support many applications for determining web page quality using collective inference based on local and global web page information. For example, a web crawler may use the present invention to determining web page quality and produce query-independent quality scores for each web page in an index, and a search engine may subsequently use the present invention for ranking retrieved web pages in a given search query context using the inferred quality score. A text categorization application may use the present invention to categorize web pages or other documents. Or an application for the detection of spam web pages may apply the present invention using a seed set of chosen spam pages. For any of these applications, a collection of documents, including web pages, may be classified by applying collective inference using local and global information of seed sets.

Advantageously, the present invention may improve predictive accuracy of text classification by combining local text features and global link information in a well-formed convex optimization solution. Other advantages will become apparent from the following detailed description when taken in conjunction with the drawings, in which:

DETAILED DESCRIPTION

Exemplary Operating Environment

Figure 1:
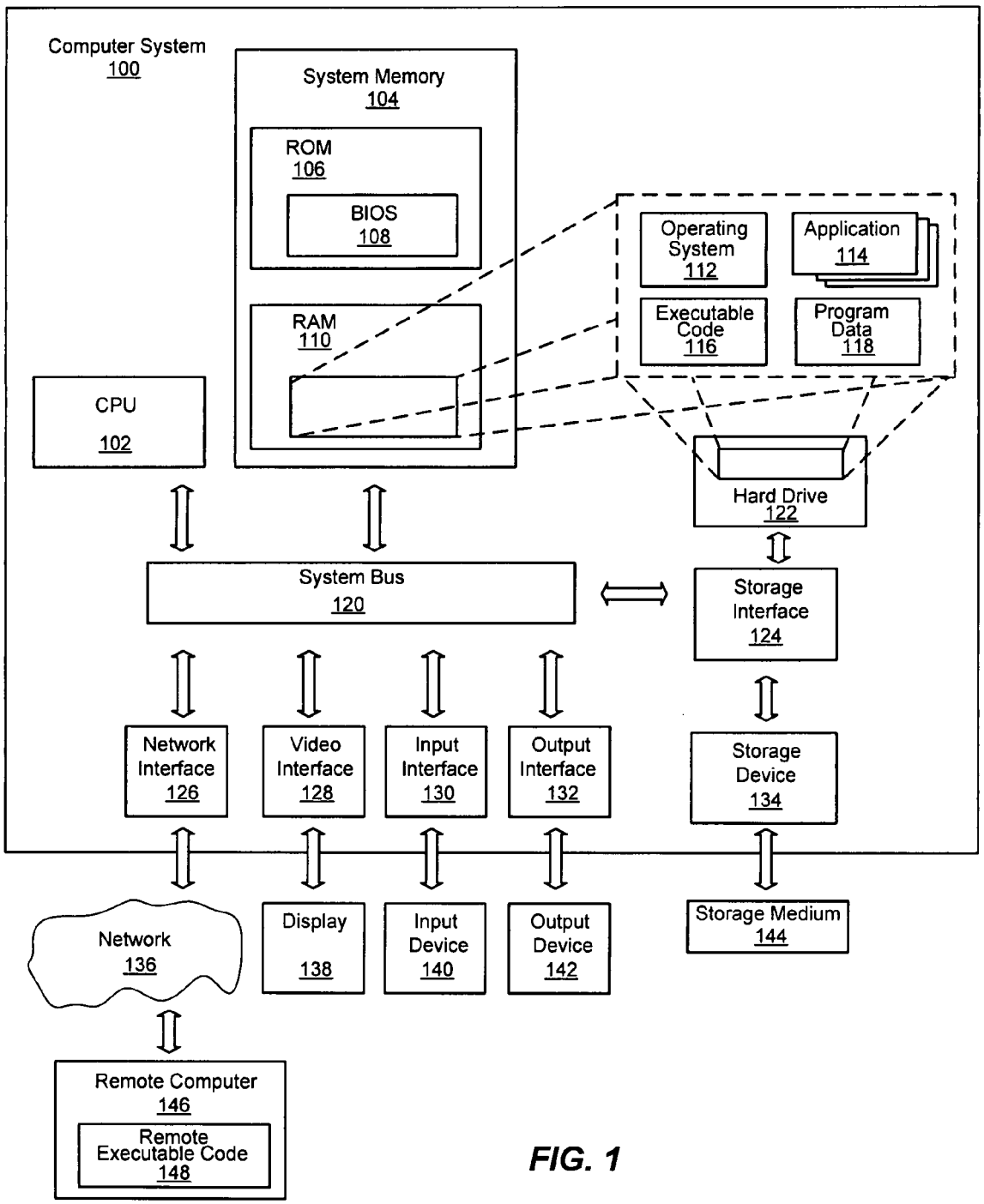
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Determining Web Page Quality Using Collective Inference Based On Local and Global Web Page Information The present invention is generally directed towards a system and method for determining web page quality using collective inference based on local and global web page information. In an embodiment, a classification engine may apply collective inference for binary classification of a web page simultaneously using local web page information of a seed set of authoritative web pages and of a seed set of non-authoritative web pages and using global web graph information of the seed set of authoritative web pages and of the seed set of non-authoritative web pages. As used herein, an authoritative web page may mean a web page of known high quality such as an educational web page, a news web page, a services web page, and so forth. As used herein, a non-authoritative web page may mean a web page of known low-quality such as a spam web page, a pornographic web page, a web page including profanity, and so forth.

As will be seen, a dual algorithm based on graph regularization formulated as a well-formed optimization solution may be used in an embodiment for implementing collective inference for binary classification of a web page using the local and global information of the web page and using the local and global information of the seed sets. As will be understood, the various block diagrams, flow charts and scenarios described herein are only examples, and there are many other scenarios to which the present invention will apply.

Figure 2:
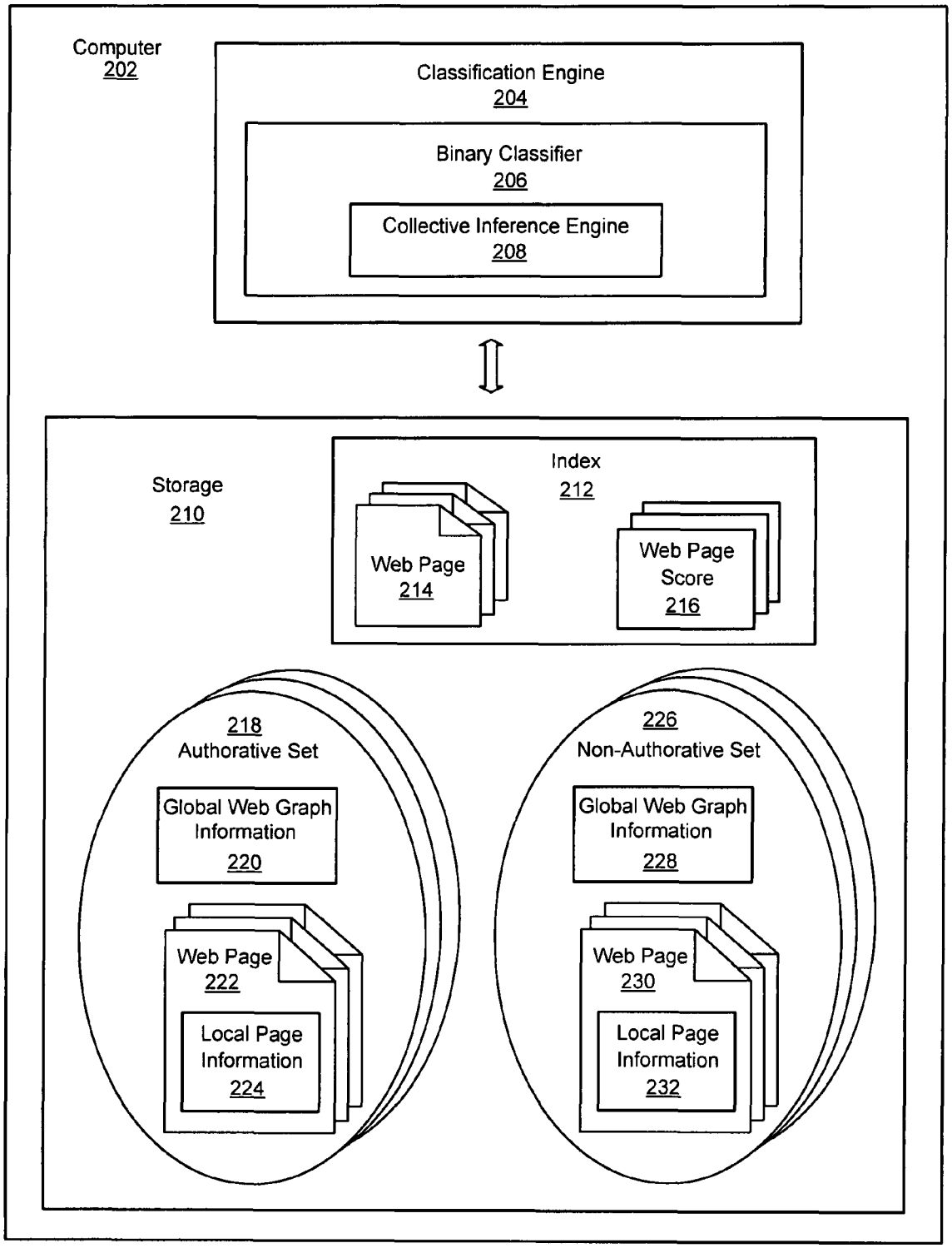
FIG. 2 is a block diagram generally representing an exemplary architecture of system components for determining web page quality using collective inference based on local and global web page information, in accordance with an aspect of the present invention.

Turning to FIG. 2 of the drawings, there is shown a block diagram generally representing an exemplary architecture of system components for determining web page quality using collective inference based on local and global web page information. Those skilled in the art will appreciate that the functionality implemented within the blocks illustrated in the diagram may be implemented as separate components or the functionality of several or all of the blocks may be implemented within a single component. For example, the functionality of the collective inference engine 208 may be implemented as a separate component from the binary classifier 206. Moreover, those skilled in the art will appreciate that the functionality implemented within the blocks illustrated in the diagram may be executed on a single computer or distributed across a plurality of computers for execution.

In various embodiments, a computer 202, such as computer system 100 of FIG. 1, may include a classification engine 204 operably coupled to storage 210. In general, the classification engine 204 may be any type of executable software code such as a kernel component, an application program, a linked library, an object with methods, and so forth. The storage 212 may be any type of computer-readable media and may store an index 212 of web pages 214, or links to web pages such as URLs, with web page scores 216 that may indicate the quality of particular web pages. The storage 212 may also store an authoritative set 218 of web pages 222 with local web page information 224 and global web graph information 220 about the authoritative set 218 of web pages 222. In an embodiment, the local web page information 224 of an authoritative set 218 of web pages 222 may be stored rather than storing the web pages 222 in their entireties. The storage 212 may additionally store a non-authoritative set 226 of web pages 230 with local web page information 232 and global web graph information 228 about the non-authoritative set 226 of web pages 230. Similarly, the local web page information 232 of a non-authoritative set 226 of web pages 230 may be stored in an embodiment rather than storing the web pages 230 in their entireties. Global web graph information may generally include hyperlink and co-citation relationships among web pages. Local web page information may include text, which may be represented as a dimensional vector of words, number of clicks, domain information or time-stamp information. The storage 210 may additionally store an index 212 of web pages 214 that have been classified and web page score 216 indicating the classification.

The classification engine 204 may provide services for training a classifier using collective inference to infer a quality/authoritive score for web pages by performing simultaneous inference using both local features of a seed set of web pages as well as global web-graph information about the seed set of web pages. The seed set of web pages may be web pages known to be of high quality (authoritative examples) or of low quality (non-authoritative examples). The classification engine 204 may include a binary classifier 206 in an embodiment for performing binary classification to provide a binary score that may be used as a web page score 216, and a collective inference engine 208 for performing simultaneous collective inference using both local features of a seed set of web pages as well as global web-graph information about the seed set of web pages to classify a web page. Each of these modules may also be any type of executable software code such as a kernel component, an application program, a linked library, an object with methods, or other type of executable software code. In an embodiment, the classification engine 204 may train the binary classifier offline using the seed sets of authoritative and non-authoritative web pages, and then the binary classifier may be used online for dynamically classifying web pages.

There are many applications which may use the present invention for determining web page quality using collective inference based on local and global web page information. For example, a web crawler may use the present invention to determining web page quality and produce query-independent quality scores for each web page in an index, and a search engine may subsequently use the present invention for ranking retrieved web pages in a given search query context using the inferred quality score. Or a text categorization application may use the present invention to categorize web pages or other documents; a search application may find similar web pages using the present invention; a web page classifier may identify web pages that may belong to a class of web pages using the present invention, and so forth. Those skilled in the art will appreciate that the techniques of the present invention are quite general and will also apply for any seed set of web pages chosen for a particular application. For instance, an application for the detection of spam web pages may apply the present invention using a seed set of chosen spam pages.

Figure 3:
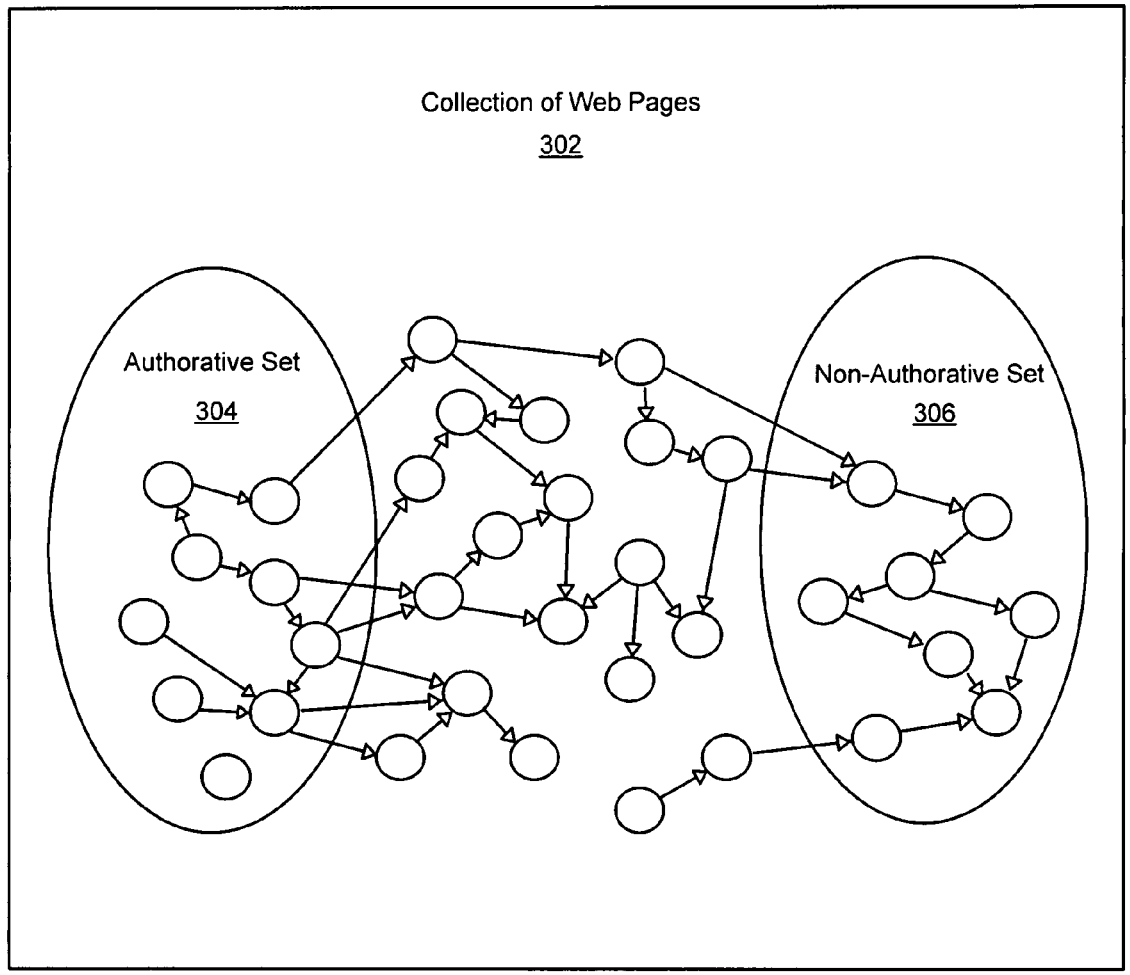
FIG. 3 is an illustration depicting in an embodiment an authoritative seed set of web pages and a non-authoritative seed set of web pages interconnected by hyperlinks within a collection of web pages, in accordance with an aspect of the present invention.

FIG. 3 presents an illustration depicting in an embodiment an authoritative seed set of web pages and a non-authoritative seed set of web pages interconnected by hyperlinks within a collection of web pages. The authoritative set of web pages 304 may be a subset of web pages within a collection of web pages 302 that may represent known high quality web pages. For instance, these web pages may be known web pages of high quality based on judgment by human reviewers or based on the sources of the web pages, such as web pages linked from a known web site. And the non-authoritative set of web pages 306 may be a subset of web pages within the collection of web pages 302 that may represent known web pages of low quality. For instance, these web pages may be known web pages of spam sites, low-caliber blogs, pornography sites, and so forth. Collective inference may directly take advantage of the full web graph view when learning model parameters. In addition to including hyperlinks, global web graph information may generally include other types of references among web pages, such as co-citation relationships among web pages Although FIG. 3 may present an illustration depicting an embodiment with two seed sets, those skilled in the art will appreciate that any number of seed sets may be used for classifying a web page. Although even one seed set may be used to classify an unknown web page, in general, multiple seed sets with global web graph information may be used for classifying unknown web pages. In various embodiments for instance, there may be one or more authoritative sets of web pages and one or more non-authoritative sets of web pages.

Figure 4:
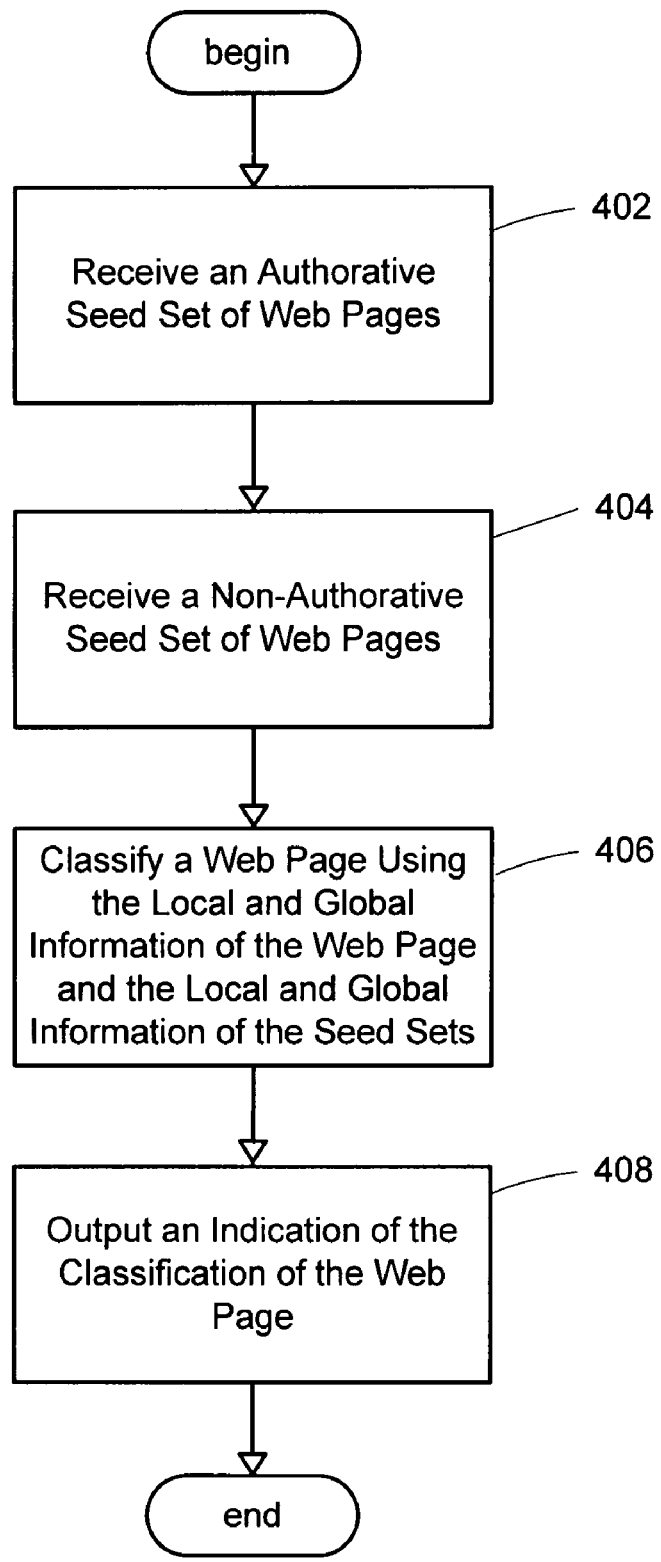
FIG. 4 is a flowchart generally representing the steps undertaken in one embodiment for classifying a web page using collective inference based on local and global web page information, in accordance with an aspect of the present invention.

FIG. 4 presents a flowchart generally representing the steps undertaken in one embodiment for classifying a web page using collective inference based on local and global web page information. A seed set of authoritative web pages page may be received at step 402, and a seed set of non-authoritative web pages may be received at step 404. Each web page may be represented by its local web page information which may include text represented as a dimensional vector of words, the number of clicks received by users, domain information or time-stamp information. Each set of web pages may also have associated global web graph information including hyperlink and co-citation relationships among web pages.

At step 406, a web page may be classified using the local and global information of the web page and the local and global information of the seed sets. In an embodiment, collective inference for binary classification may be applied using the local and global information of the web page and using the local and global information of the seed sets. At step 408, an indication of the classification of the web page may be output. In an application, for instance, a web page of unknown quality may be discovered by a web crawler that may classify the web page and produce a quality score for storing in an index of crawled web pages. After an indication of the classification of a web page may be output, processing may be finished for classifying a web page using collective inference based on local and global web page information.

In general, applying collective inference may be considered predicting a real-valued output y based on its corresponding input vector x. A set of labeled data $(X_i, Y_i)$ for $i=1, \ldots, n$ and a set of unlabeled data $X_j$ for $j=n+1, \ldots, m$ may be observed where the true values of $Y_j$ and $X_j$ may be unknown. The functional relationship $Y_j \approx p(X_j)$ for $j=1, \ldots, m$ may be estimated by minimizing the risk of $$\sum_{j=n+1}^{m} L(p(X_j), Y_j)$$

where $L(p,Y)$ may be a loss function and $p(x)$ may be a real-valued function.

Considering that $X_k$ for $k=1, \ldots, m$ may be fixed, a graph structure may also be observed on the data set $X_k$ for $k=1, \ldots, m$. The vertices of the graph may be the nodes $X_k$ and edges may be defined between node pairs. In the context of web-classification, the nodes may be web pages and the edges may be links or co-citations between web pages. If two nodes $X_k$ and $X_l$ are connected by an edge, then $X_k$ and $X_l$ may be likely to nodes $X_k$ and edges may be defined between node pairs by weights $c_{k,k'}$ associated with an edge, $(k,k') \in E$. A graph Laplacian regularization condition, R, may accordingly be defined as $$f^T L R f = \sum_{(k,k') \in E} c_{k,k'} (f_k - f_{k'})^2.$$

In an embodiment, $c_{k,k'}$ may be set to 1.

At step 508, collective inference for binary classification may be applied using the local and global information of the web page and using the local and global information of the seed sets. For a set of training data, $(X_i, Y_i)$, a linear weight w, such that $Y \approx p(X) = w^T \psi(X)$, may be computed using a regularized linear prediction method, where $$\hat{p}(x) = \hat{w}^T \psi(x), \hat{w} = \arg\min_{w \in F} \left[ \frac{1}{n} \sum_{i=1}^{n} L(w^T \psi(X_i), Y_i) + \frac{\lambda}{2} w^T w \right],$$

and $\lambda > 0$ may be an appropriate regularization parameter that may be derived from a graph regularization condition such as R. Then the predictor, $\hat{p}(x)$, may be applied to $X_j$ for j=n+1, ..., m to estimate $Y_j$. At step 510, an indication of the binary classification of the web page may be output. In an embodiment, a value of +1 or −1 may be assigned to Y such that Y∈{±1} by assigning the corresponding class label $Y_j$ of $X_j$ as sign($\hat{w}^T\psi(x)$), given the weight vector $\hat{w}$.

There may be several ways to derive optimization procedures using a regularized linear prediction method, where have similar predictive values such that $p(X_k) \approx p(X_l)$. The graph structure may be used to construct a regularization condition for $p(X_j)$. Then n out of m labeled samples of $X_k$ may be selected and the corresponding labels may be revealed. Using the predictive value of the regularized condition for $p(X_j)$, $Y_j$ may be estimated.

Figure 5:
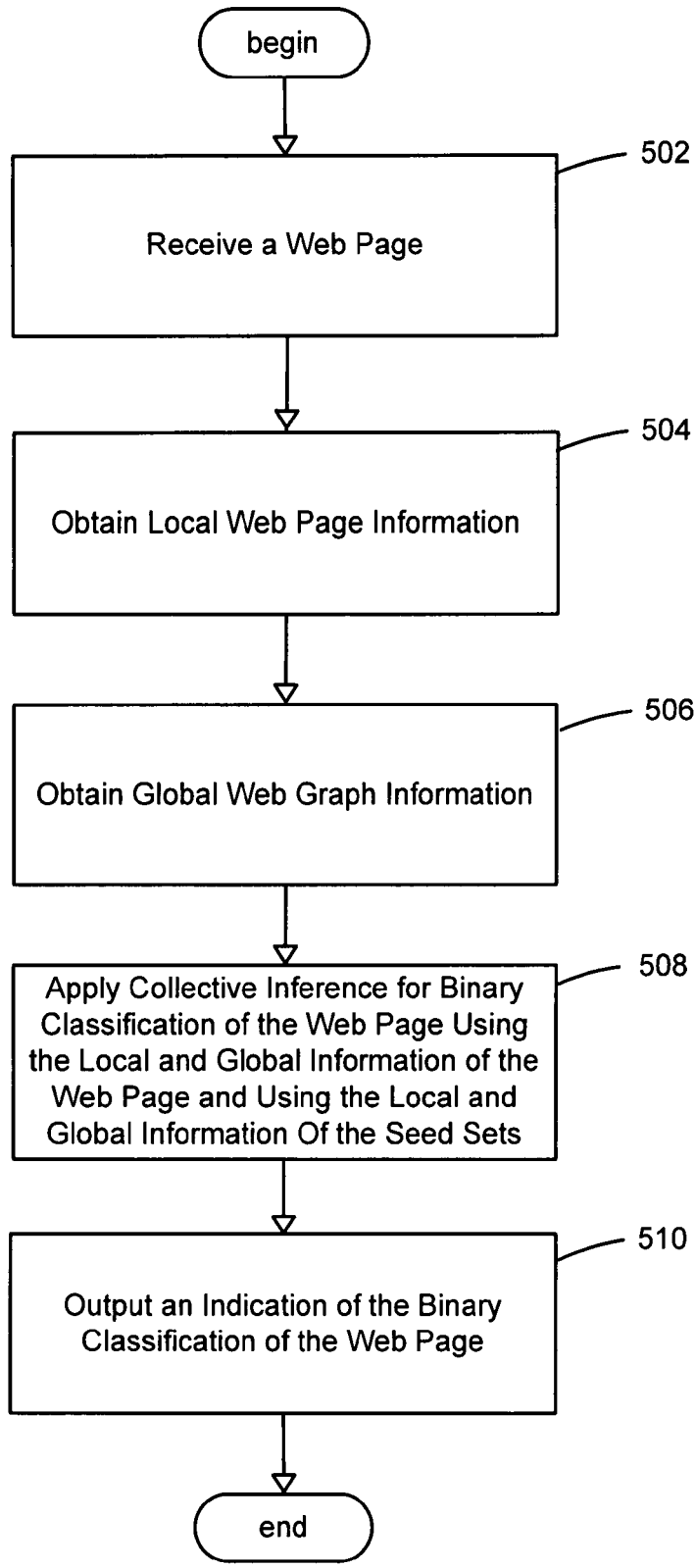
FIG. 5 is a flowchart generally representing the steps undertaken in one embodiment for classifying a web page by applying collective inference for binary classification using the local and global information of the web page and using the local and global information of the seed sets, in accordance with an aspect of the present invention.

FIG. 5 presents a flowchart generally representing the steps undertaken in one embodiment for classifying a web page by applying collective inference for binary classification using the local and global information of the web page and using the local and global information of the seed sets. At step 502, a web page may be received. In various applications, the web page may be a web page of unknown quality. At step 504, local web page information may be obtained for the web page. For instance, a high-dimensional vector of words representing the local web page information may be received. The high-dimensional vector of words may be represented by $\psi(X)$. At step 506, global web graph information may be obtained for the web page. This may include information about other web pages linked to or from the web page, and/or a citation to or from another web page. The global web graph information may form a weighted bipartite graph represented by an m×m matrix, where the vertices of the graph may be the $\hat{p}(x) = \hat{w}^T\psi(x)$, $$\hat{p}(x) = \hat{w}^T\psi(x), \ \hat{w} = \arg\min_{w \in F}\left[\frac{1}{n}\sum_{i=1}^{n} L(w^T\psi(X_i), Y_i) + \frac{\lambda}{2}w^T w\right],$$

and λ>0 may be an appropriate regularization parameter that may be derived from a graph regularization condition such as $$f^T L R f = \sum_{(k,k') \in E} c_{k,k'}(f_k - f_{k'})^2.$$

For example, the following generalized form may be derived:

$$f_i = u^T\phi_i \ (i = 1, \ldots, m),$$

$$\hat{u} = \arg\min_{u}\left[\frac{1}{n}\sum_{i=1}^{n} L(u^T\phi_i, Y_i) + \frac{\lambda'}{2}\sum_{(k,k') \in E} c_{k,k'}(u^T\phi_{k,k'})^2 + \frac{\lambda}{2}u^2\right].$$

Since the number of edges in E is often large, all the feature vectors $\phi_{k,k'}$ may not be stored in memory. Considering that the local feature vectors $\phi_i$ may be stored in memory for i=1, ..., m, a dual formulation for solving a weight vector û may be derived for computing one node dual variable at a time and then for computing one edge dual variable at a time as follows:

$$[\hat{u}, \alpha] = \arg\min_{u,\alpha}\left[\frac{1}{n}\sum_{i=1}^{n} L_D(-\lambda n\alpha_i, Y_i) + \frac{\lambda^2}{2\lambda'}\sum_{(k,k') \in E} c_{k,k'}^{-1}\alpha_{k,k'}^2 + \frac{\lambda}{2}u^2\right],$$

such that $$u = \sum_{i=1}^{n} \alpha_i\phi_i + \sum_{(k,k') \in E} \alpha_{k,k'}\phi_{k,k'}.$$

The function $L_D(a,y)$ may represent the convex dual of L, defined as $L_D(a,y) = \sup_{f \in R}[af - L(f,y)]$. The set of variables α may represent the dual variable, while u may represent the primal variable. There may be a dual variable for each node, and a dual variable for each edge. In general, the implementation of the dual algorithm is to vary one $\alpha_i$, corresponding to node dual-variable update, or one $\alpha_{k,k'}$, corresponding to an edge dual-variable update, at a time, while keeping the remaining dual variables fixed. The primal variable may be set during an iteration as $$u = \sum_{i=1}^{n} \alpha_i\phi_i + \sum_{(k,k') \in E} \alpha_{k,k'}\phi_{k,k'}.$$

Figure 6:
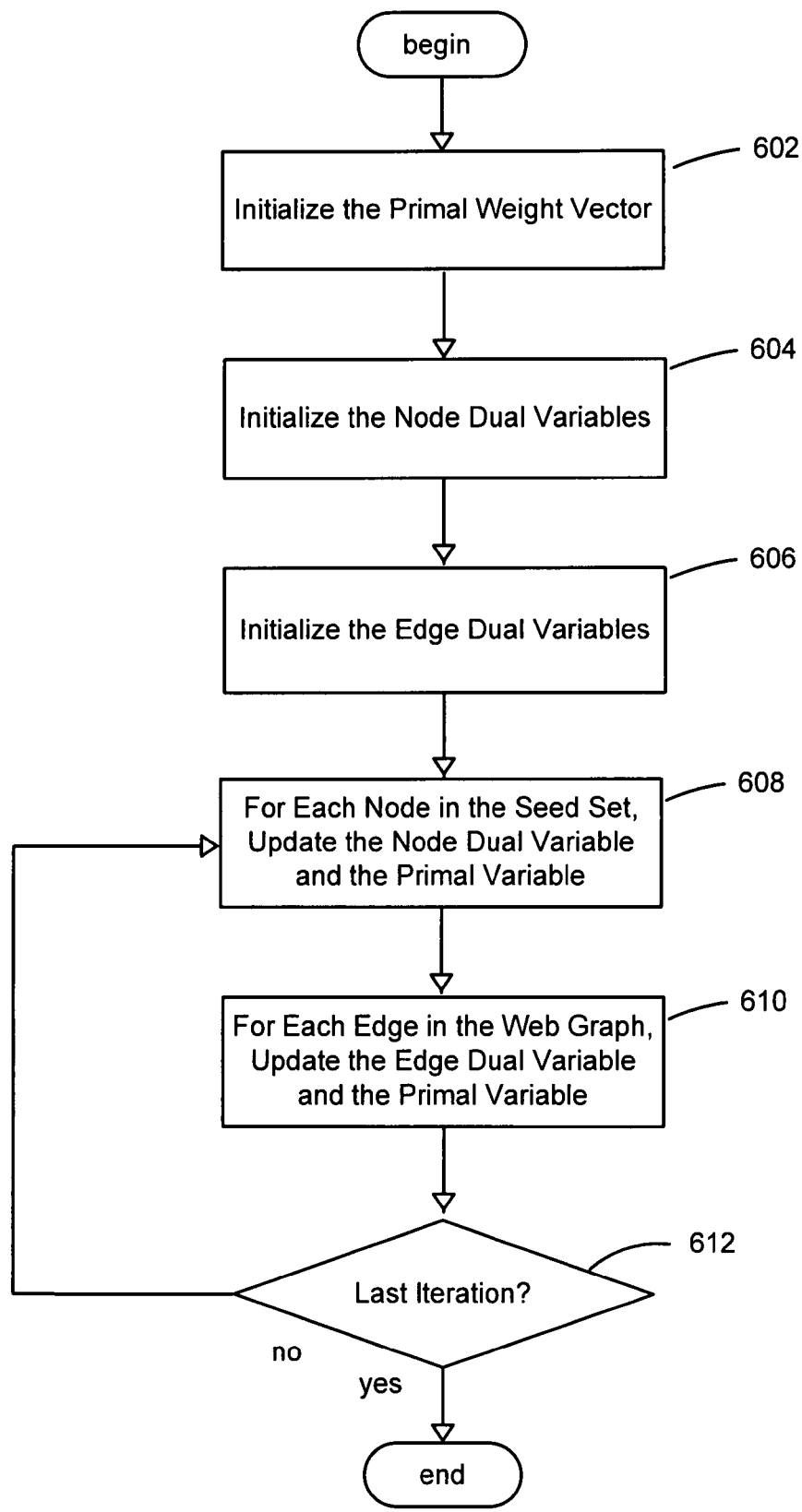
FIG. 6 is a flowchart generally representing the steps undertaken in an embodiment for applying a dual algorithm to implement collective inference for binary classification of a web page using the local and global information of the web page and using the local and global information of the seed sets, in accordance with an aspect of the present invention.

FIG. 6 presents a flowchart generally representing the steps undertaken in one embodiment for applying a dual algorithm to implement collective inference for binary classification of a web page using the local and global information of the web page and using the local and global information of the seed sets. In general, the following dual algorithm based on graph regularization formulated as a well-formed optimization problem may be used in an embodiment for implementing collective inference for binary classification of a web page using the local and global information of the web page and using the local and global information of the seed sets:

---

Dual Algorithm
1. u ← 0                          /* initialize primal weight vector */
2. $\alpha_i$ ← 0, $\alpha_{k,k'}$ ← 0    /* initialize dual variables */
3. for l = 1, ..., L : /* iterate loop L times */
   3.1 for i = 1, ..., n:  /* for each node */
   3.1.1.

$$\min_{\Delta\alpha_i}\left[L_D(-\lambda n(\alpha_i + \Delta\alpha_i), Y_i) + \frac{\lambda n}{2}(u + \Delta\alpha_i\phi_i)^2\right]$$

3.1.2.                     $\alpha_i \leftarrow \alpha_i + \Delta\alpha_i$
   3.1.3.                     $u \leftarrow u + \Delta\alpha_i\phi_i$
   3.2 for each (k,k') ∈ E :   /* for each edge */
   3.2.1.

$$\Delta\alpha_{k,k'} \leftarrow -\eta \frac{\lambda\alpha_{k,k'} + \lambda'c_{k,k'}u^T\phi_{k,k'}}{\lambda + \lambda'c_{k,k'}\phi_{k,k'}^T\phi_{k,k'}}$$

3.2.2.                     $\alpha_{k,k'} \leftarrow \alpha_{k,k'} + \Delta\alpha_{k,k'}$
   3.2.3                     $u \leftarrow u + \Delta\alpha_{k,k'}\phi_{k,k'}$
4. $\hat{f}_i = u^T\phi_i$ (i = 1, ..., n)  /* assign predictive values */

---

At step 602, a primal weight vector may be initialized. In an embodiment, the elements of the primal weight vector may be initialized to zero, u←0. At step 604, dual variables for the nodes may be initialized. In an embodiment, the dual node variables may be initialized to zero. At step 606, dual variables for the edges may be initialized. In an embodiment, the dual edge variables may be initialized to zero. At step 608, the dual node variable and the primal variable may be updated for each node in a seed set. At step 610, the dual edge variable and the primal variable may be updated for each edge in a graph. At step 612, it may be determined whether the last iteration has occurred for updating the dual variables for nodes and edges. If not, then another iteration may continue at step 608. Otherwise, processing may be finished for applying a dual algorithm to implement collective inference for binary classification of a web page using the local and global information of the web page and using the local and global information of the seed sets.

Figure 7:
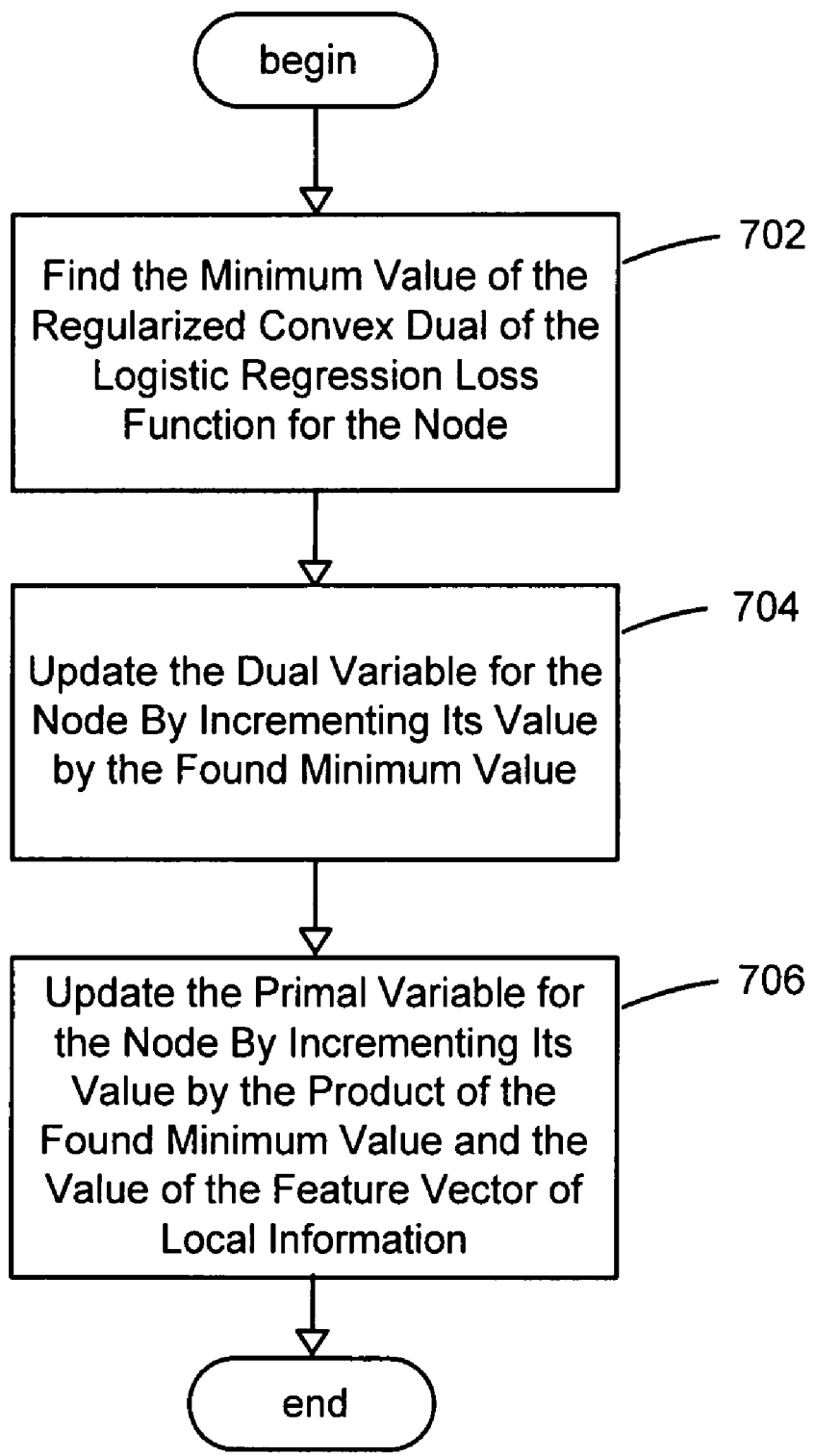
FIG. 7 is a flowchart generally representing the steps undertaken in an embodiment for updating the dual node variable and the primal variable for each node in a seed set in applying a dual algorithm to implement collective inference for binary classification of a web page using the local and global information of the web page and using the local and global information of the seed sets, in accordance with an aspect of the present invention.

FIG. 7 presents a flowchart generally representing the steps undertaken in one embodiment for updating the dual node variable and the primal variable for each node in a seed set in applying a dual algorithm to implement collective inference for binary classification of a web page using the local and global information of the web page and using the local and global information of the seed sets. At step 702, the minimum value of the regularized convex dual of the logistic regression loss function may be found for the node. In an embodiment, the minimum value of the following function may be solved:

$$\min_{\Delta \alpha_i} \left[ L_D(-\lambda n(\alpha_i + \Delta \alpha_i), Y_i) + \frac{\lambda n}{2}(u + \Delta \alpha_i \phi_i)^2 \right].$$

At step 704, the dual variable for the node may be updated by incrementing its value by the found minimum value such that $\alpha_i \leftarrow \alpha_i + \Delta \alpha_i$. At step 706, the primal variable for the node be updated by incrementing its value by the product of the found minimum value and the value of the feature vector of local information such that $u \leftarrow u + \Delta \alpha_i \phi_i$.

Figure 8:
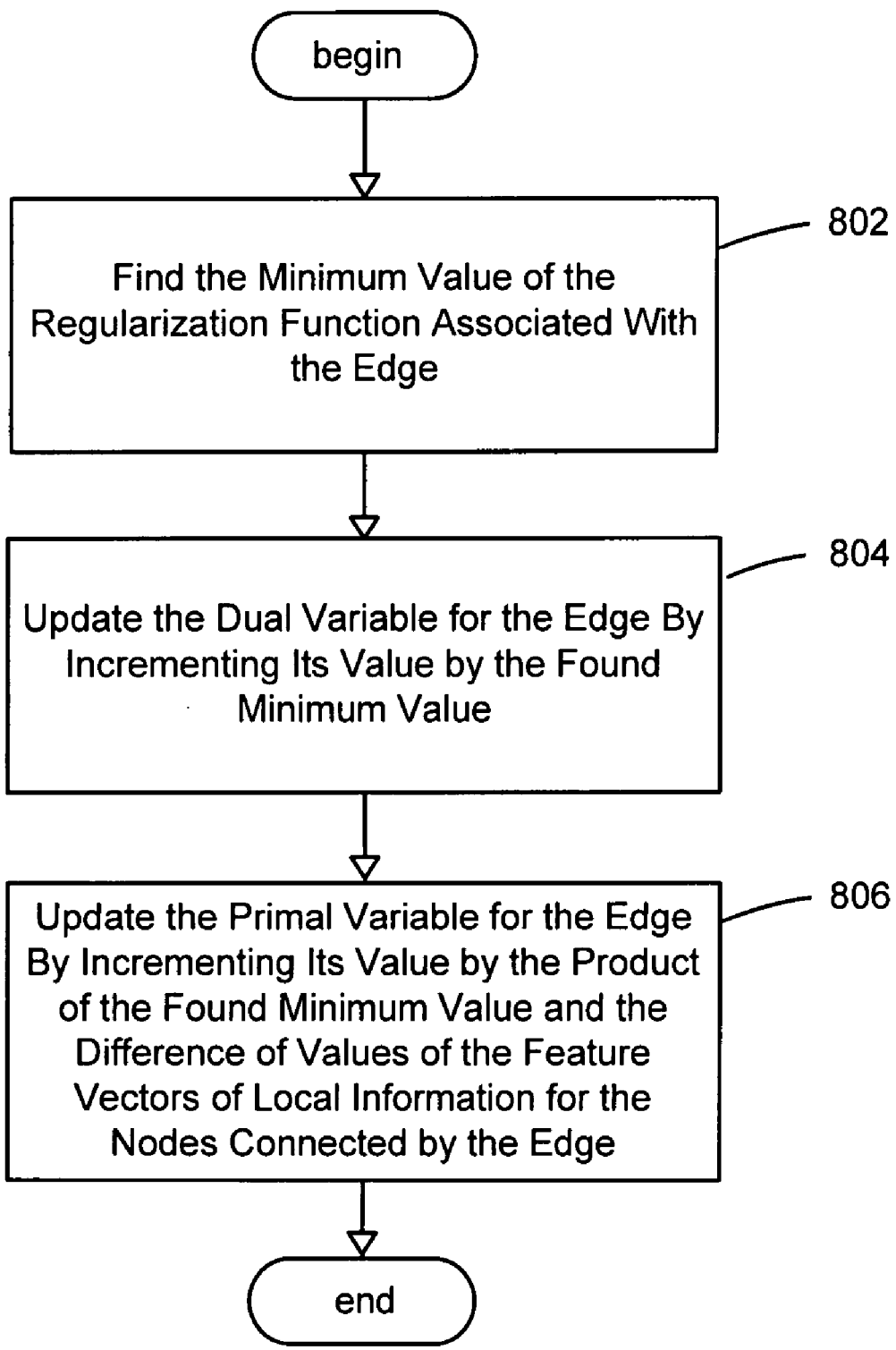
FIG. 8 is a flowchart generally representing the steps undertaken in an embodiment for updating the dual edge variable and the primal variable for each edge in a web graph in applying a dual algorithm to implement collective inference for binary classification of a web page using the local and global information of the web page and using the local and global information of the seed sets, in accordance with an aspect of the present invention.

FIG. 8 presents a flowchart generally representing the steps undertaken in one embodiment for updating the dual edge variable and the primal variable for each edge in a web graph in applying a dual algorithm to implement collective inference for binary classification of a web page using the local and global information of the web page and using the local and global information of the seed sets. At step 802, the minimum value of the regularization function associated with the edge may be found. In an embodiment, the minimum value of change of the following function may be solved:

$$\Delta \alpha_{k,k'} \leftarrow -\eta \frac{\Delta \alpha_{k,k'} + \lambda' c_{k,k'} u^T \phi_{k,k'}}{\lambda + \lambda' c_{k,k'} \phi_{k,k'}^T \phi_{k,k'}}.$$

The parameter $\eta \epsilon (0,1)$ may be used to enhance the stability of the algorithm and the value of 0.1 may be used for $\eta$ in an embodiment. At step 804, the dual variable for the edge may be updated by incrementing its value by the found minimum value such that $\alpha_{k,k'} \leftarrow \alpha_{k,k'} + \Delta \alpha_{k,k'}$. At step 806, the primal variable for the edge may be updated by incrementing its value by the product of the found minimum value and the difference of values of the feature vectors of local information for the nodes connected by the edge such that $u \leftarrow u + \Delta \alpha_{k,k'} \phi_{k,k'}$.

Those skilled in the art will appreciate that there may be other implementations for updating weights of features and links by updating variable for nodes and then updating the variables for the graph information such as edge weights. For example, a stochastic gradient descent algorithm may be used for evaluating one data point i, or one edge (k, k') at a time, and a weight vector u may be updated based on the gradient of the cost function at the examined point. Alternatively, simplifications may be applied such as subsampling the graph by removing some nodes, or computing a weight vector based on $$\hat{w} = \arg \min_{w \in F} \left[ \frac{1}{n} \sum_{i=1}^{n} L(w^T \psi(X_i), Y_i) + \frac{\lambda}{2} w^T w \right]$$

and then computing a feature $\hat{w}^T(x)$ for each document x.

Thus the present invention may accurately classify an unknown instance of a large collection of documents by using a dual algorithm based on graph regularization formulated as a well-formed optimization solution in an embodiment for implementing collective inference for binary classification of the document using the local and global information of the document and using the local and global information of the seed sets of documents. The dual algorithm has the advantage of minimizing storage requirements to local feature vectors during each iteration of updating node and edge dual variables. Thus, large scale application with hundreds of thousands of documents, such as text categorization applications of web documents, may use the present invention for classifying an instance of a document from a large collection of documents.

As can be seen from the foregoing detailed description, the present invention provides an improved system and method for determining web page quality using collective inference based on local and global web page information. Advantageously, the present invention may improve predictive accuracy of text classification by combining local text features and link information in a well-formed convex optimization solution. Such a system and method may thus provide an implementable solution suitable for large scale text classification problems. Many applications performing link-based analysis of a graph representing a collection of web pages may also use the present invention for determining web page quality. As a result, the system and method provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for classifying a web page, comprising:
   one or more processors to execute instructions;
   a classification engine for determining a quality of the web page using local features of a seed set of web pages and global web graph information about the seed set of web pages, wherein:
   each web page of the seed set of web pages is a web page of a known quality, the local features of the seed set of web pages comprises text, clicking, domain, or time stamp information concerning the seed set of web pages, and
   the global web graph information about the seed set of web pages comprises hyperlink or co-citation relationships among the seed set of web pages;

a binary classifier coupled to the classification engine for performing binary classification to provide a binary score for the web page; and a collective inference engine coupled to the binary classifier for performing collective inference by applying collective inference for binary classification using the local features of the seed set of web pages and the global web graph information about the seed set of web pages, comprising finding a minimum value of a regularized convex dual of a logistic regression loss function for a node of a graph.

2. The system of claim 1 further comprising a storage coupled to the classification engine for storing the local features of the seed set of web pages and the global web graph information about the seed set of web pages.

3. The system of claim 2 wherein the storage is for further storing local web page information of a second seed set of web pages and global web graph information about the second seed set of web pages.

4. A computer-readable non-transitory storage medium having computer-executable components comprising the system of claim 1.

5. A computer-implemented method for classifying a web page, comprising:

accessing, by one or more computing devices, local web page information of and global web graph information about a plurality of authoritative web pages, local web page information of and global web graph information about a plurality of non-authoritative web pages, and local web page information of and global web graph information about the web page, wherein:

each authoritative web page of the plurality of authoritative web pages is a web page of known high quality, each non-authoritative web page of the plurality of non-authoritative web pages is a web page of known low quality, the local web page information of the web pages comprises text, clicking, domain, or time stamp information concerning the web pages, and the global web graph information about the web pages comprises hyperlink or co-citation relationships among the web pages;

determining, by the one or more computing devices, a quality of the web page using collective inference by applying collective inference for binary classification of the web page using the local web page information of the web page and the global web graph information about the web page, the local web page information of the plurality of authoritative web pages and the global web graph information about the plurality of authoritative web pages, and the local web page information of the plurality of non-authoritative web pages and the global web graph information about the plurality of non-authoritative web pages, comprising finding a minimum value of a regularized convex dual of a logistic regression loss function for a node of a graph; and outputting, by the one or more computing devices, an indication of the quality of the web page.

6. The method of claim 5 further comprising receiving the local web page information of and the global web graph information about the plurality of the authoritative web pages.

7. The method of claim 5 further comprising receiving the local web page information of and the global web graph information about the plurality of the non-authoritative web pages.

8. The method of claim 5 further comprising obtaining the local web page information of the web page.

9. The method of claim 5 further comprising obtaining the global web graph information about the web page.

10. The method of claim 5 wherein outputting the indication of the quality of the web page comprises outputting an indication of the binary classification of the web page.

11. The method of claim 5 wherein applying collective inference for binary classification of the web page using the local web page information of the web page and the global web graph information about the web page, the local web page information of the plurality of authoritative web pages and global web graph information about the plurality of authoritative web pages, and the local web page information of the plurality of non-authoritative web pages and global web graph information about the plurality of non-authoritative web pages further comprises incrementing a value of a dual variable for the node of the graph by the minimum value of the regularized convex dual of the logistic regression loss function for the node of the graph.

12. A computer-readable non-transitory storage medium having computer-executable instructions for performing the method of claim 5.

13. A computer-implemented method for classifying a web page, comprising:

accessing, by one or more computing devices, local web page information of and global web graph information about a plurality of authoritative web pages, local web page information of and global web graph information about a plurality of non-authoritative web pages, and local web page information of and global web graph information about the web page, wherein:

each authoritative web page of the plurality of authoritative web pages is a web page of known high quality, each non-authoritative web page of the plurality of non-authoritative web pages is a web page of known low quality, the local web page information of the web pages comprises text, clicking, domain, or time stamp information concerning the web pages, and the global web graph information about the web pages comprises hyperlink or co-citation relationships among the web pages;

determining, by the one or more computing devices, a quality of the web page using collective inference by applying collective inference for binary classification of the web page using the local web page information of the web page and the global web graph information about the web page, the local web page information of the plurality of authoritative web pages and global web graph information about the plurality of authoritative web pages, and the local web page information of the plurality of non-authoritative web pages and global web graph information about the plurality of non-authoritative web pages, comprising finding a minimum value of a regularization function associated with an edge of a graph; and outputting, by the one or more computing devices, an indication of the quality of the web page.

14. The method of claim 13 wherein applying collective inference for binary classification of the web page using the local web page information of the web page and the global web graph information about the web page, the local web page information of the plurality of authoritative web pages and global web graph information about the plurality of authoritative web pages, and the local web page information of the plurality of non-authoritative web pages and global web graph information about the plurality of non-authoritative web pages further comprises incrementing a value of a dual variable for the edge of the graph by the minimum value of the regularization function associated with the edge of the graph.

15. A computer system for classifying a web page, comprising: means for accessing
  local web page information of and global web graph information about a plurality of first web pages,
  local web page information of and global web graph information about the web page,
  wherein:
    each first web page of the plurality of first web pages is a web page of known first quality,
    the local web page information of the web pages comprises text, clicking, domain, or time stamp information concerning the web pages, and
    the global web graph information about the web pages comprises hyperlink or co-citation relationships among the web pages;
  means for determining a quality of the web page using collective inference by applying collective inference for binary classification of the web page using the local web page information of the web page and the global web graph information about the web page and the local web page information of the plurality of first web pages and the global web graph information about the plurality of first web pages, comprising:
  means for finding a minimum value of a regularized convex dual of a logistic regression loss function for a node of a graph; and
  means for outputting an indication of the classification of the web page.

16. The computer system of claim 15 further comprising:
  means for accessing local web page information of and global web graph information about a plurality of second web pages, wherein each second web page of the plurality of second web pages is a web page of known second quality;
  wherein determining the quality of the web page using collective inference is further based on the local web page information of the plurality of second web pages and the global web graph information about the plurality of second web pages.

17. The computer system of claim 16 further comprising:
  means for receiving the local web page information of and the global web graph information about the plurality of first web pages; and
  means for receiving the local web page information of and the global web graph information about the plurality of second web pages.

18. A method comprising:
  accessing, by one or more computing devices,
    local web page information of and global web graph information about a plurality of first web pages,
    local web page information of and global web graph information about a plurality of second web pages, and
    local web page information of and global web graph information about a third web page,
  wherein:
    each first web page of the plurality of first web pages is of a known first quality;
    each second web page of the plurality of second web pages is of a known second quality;
    the local web page information of the web pages comprises text contained in the web pages, and
    the global web graph information about the web pages comprises hyperlink relationships among the web pages;
  determining, by the one or more computing devices, a quality of the third web page using collective inference by applying collective inference for binary classification of the third web page using the local web page information of and the global web graph information about the plurality of first web pages, the local web page information of and the global web graph information about the plurality of second web pages, and the local web page information of and the global web graph information about the third web page, wherein:
    the collective inference is used to infer a quality score for the third web page; and
    applying collective inference for binary classification of the third web page comprises:
      computing at least one linear weight using a regularized linear prediction model based on the at least one dimensional vector of words;
      determining a graph regularization condition for the graph;
      deriving a regularization parameter from the graph regularization condition; and
      estimating the quality of the third web page based on the at least one linear weight and the regularization parameter; and
  outputting, by the one or more computing devices, an indication of the quality of the third web page.

19. The method recited in claim 18, wherein:
  each first web page of the plurality of first web pages is of a known high quality;
  each second web page of the plurality of second web pages is of a known low quality;
  each first web page of the plurality of first web pages and the third web page are directly or indirectly linked via at least one first hyperlinks; and
  each second web page of the plurality of second web pages and the third web page are directly or indirectly linked via at least one second hyperlinks.

20. The method recited in claim 19, further comprising:
  representing the text of the local web page information of the plurality of first web pages, the plurality of second web pages, and the third web page using at least one dimensional vector of words; and
  representing the hyperlink relationships of the global web graph information about the plurality of first web pages, the plurality of second web pages, and the third web page using a graph that comprises a plurality of nodes and a plurality of edges, wherein each node of the graph represents one of the web pages, and each edge of the graph connects two of the nodes where the corresponding two web pages are linked.

21. The method recited in claim 20, wherein determining the quality of the third web page using collective inference comprises applying a dual algorithm for binary classification of the third web page based on the local web page information of and the global web graph information about the plurality of first web pages, the local web page information of and the global web graph information about the plurality of second web pages, and the local web page information of and the global web graph information about the third web page.

22. The method recited in claim 21, wherein applying the dual algorithm for binary classification of the third web page comprises:
   initializing a primal weight vector, a plurality of node variables corresponding to the plurality of nodes of the graph, and a plurality of edge variables corresponding to the plurality of edges of the graph; and
   iteratively updating the primal weight vector, the plurality of node variables, and the plurality of edge variables.

23. The method recited in claim 22, wherein:
   updating the node variable of a node of the graph during an iteration comprises:
      determining a first minimum value of a regularized convex dual of a logistic regression loss function for the node based on a current value of the primal weight vector; and
      incrementing a current value of the node variable by the first minimum value; and
   updating the edge variable of an edge of the graph during an iteration comprises:
      determining a second minimum value of a regularization function associated with the edge; and
      incrementing a current value of the edge variable by the second minimum value.

24. The method recited in claim 18, wherein:
   the local web page information of the web pages further comprises clicking, domain, and time-stamp information; and
   the global web graph information about the web pages further comprises co-citation relationships among the web pages.

* * * * *